No. 696,326. Patented Mar. 25, 1902.
M. DE LA GARZA.
SOLAR HEATING APPARATUS.
(Application filed Apr. 1, 1901.)
(No Model.) 3 Sheets—Sheet 1.

WITNESSES:

INVENTOR
Marcos de la Garza
BY
ATTORNEYS

No. 696,326. Patented Mar. 25, 1902.
M. DE LA GARZA.
SOLAR HEATING APPARATUS.
(Application filed Apr. 1, 1901.)
(No Model.) 3 Sheets—Sheet 2.
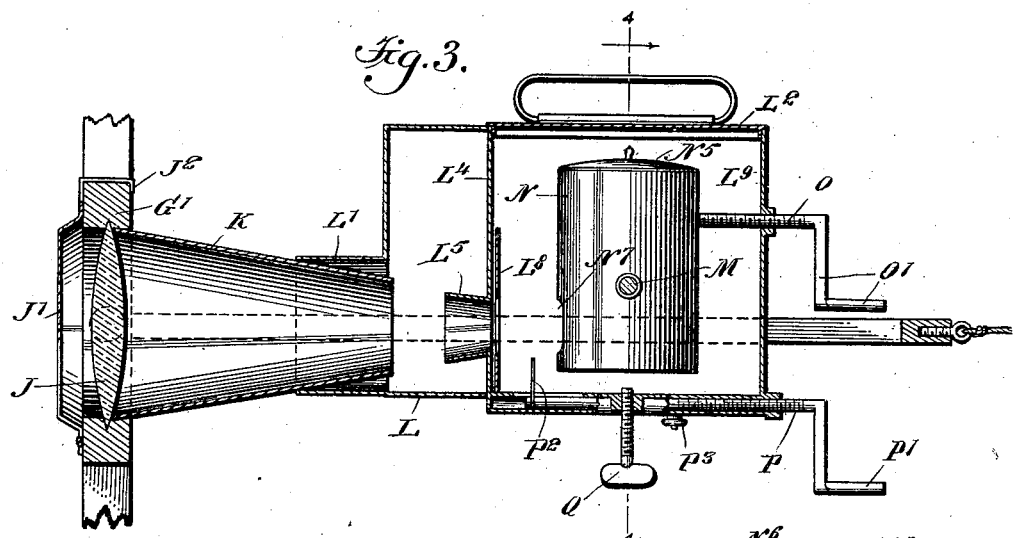
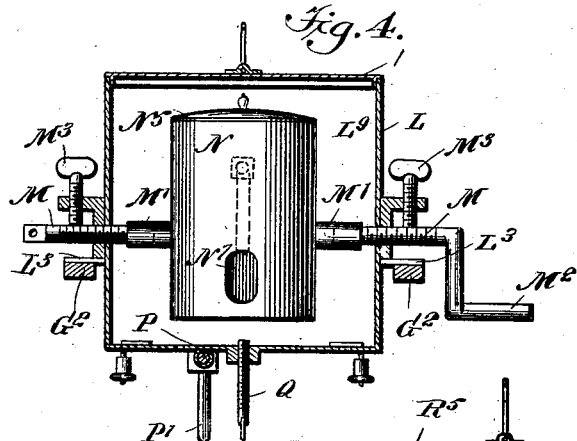
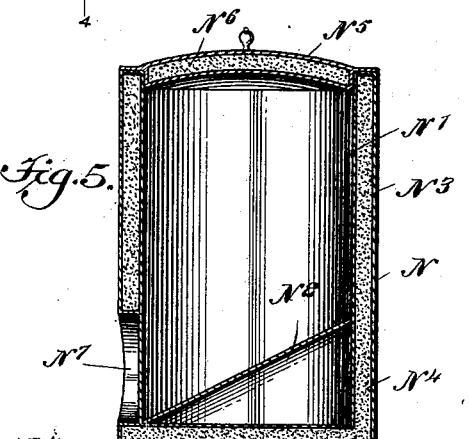
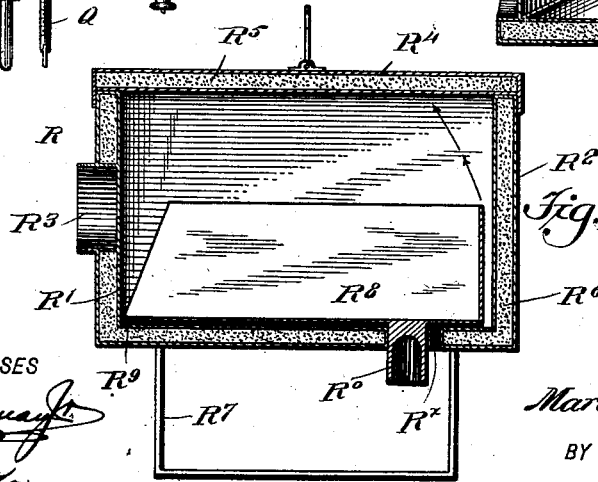
WITNESSES
INVENTOR
Marcos de la Garza
BY
ATTORNEYS No. 696,326. Patented Mar. 25, 1902.
M. DE LA GARZA.
SOLAR HEATING APPARATUS.
(Application filed Apr. 1, 1901.)
(No Model.) 3 Sheets—Sheet 3.

WITNESSES:

INVENTOR
Marcos de la Garza
BY
ATTORNEYS

UNITED STATES PATENT OFFICE.

MARCOS DE LA GARZA, OF CHIHUAHUA, MEXICO.

SOLAR HEATING APPARATUS.

SPECIFICATION forming part of Letters Patent No. 696,326, dated March 25, 1902.

Application filed April 1, 1901. Serial No. 53,827. (No model.)

*To all whom it may concern:*

Be it known that I, MARCOS DE LA GARZA, a citizen of the Republic of Mexico, and a resident of Chihuahua, Mexico, have invented a new and Improved Solar Heating Apparatus, of which the following is a full, clear, and exact description.

My invention relates to devices enabling the rays of the sun to be utilized for heating purposes, saving the cost of fuel, and obtaining a high degree of heat with cleanliness and without injurious action on the articles which are being cooked, while the cost of the apparatus does not exceed that of an ordinary stove.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1:
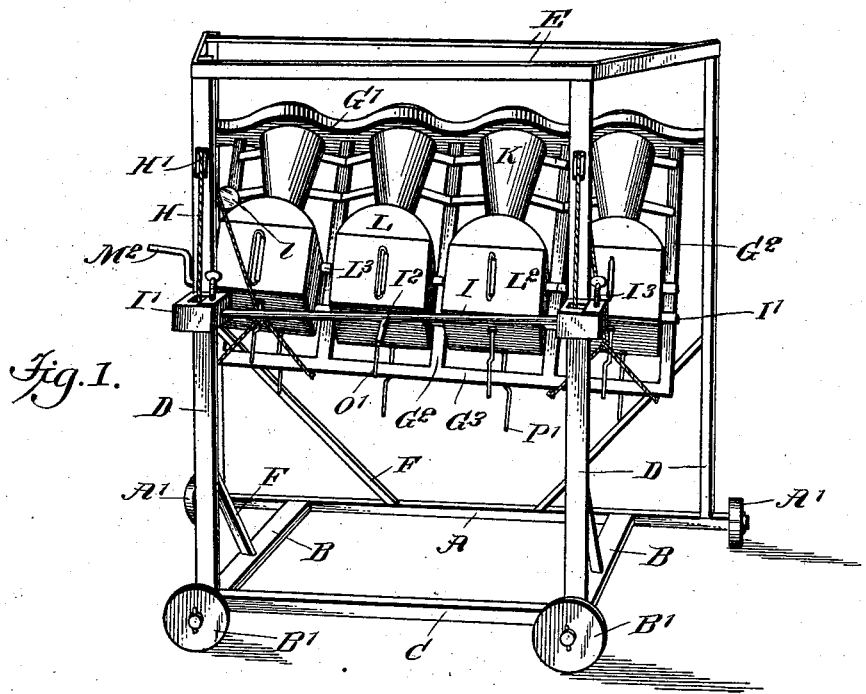
Figure 2:
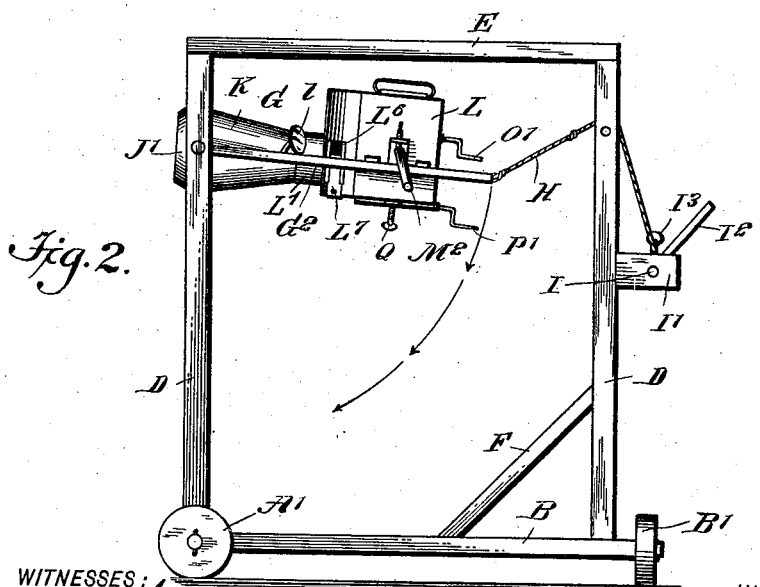
Figure 7:
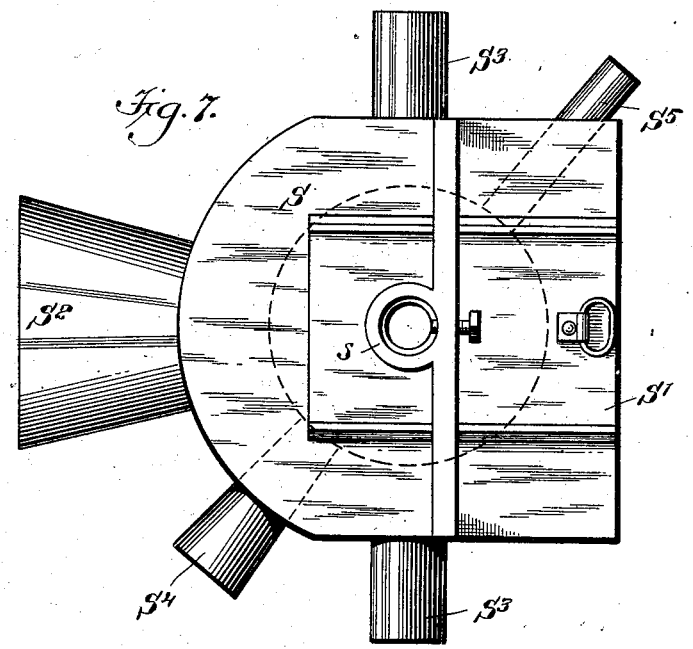
Figure 8:
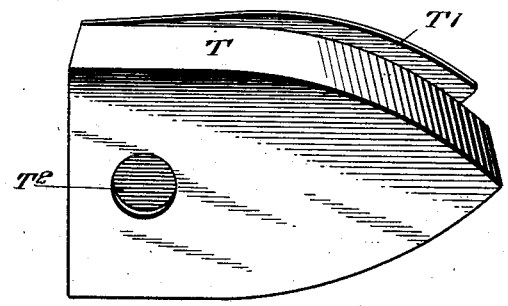

Figure 1 is a perspective view of the entire apparatus. Fig. 2 is a side elevation thereof. Fig. 3 is a detail longitudinal sectional elevation of one of the cooking utensils and its appurtenances. Fig. 4 is a cross-section on line 4 4 of Fig. 3. Figs. 5 and 6 are sectional elevations of two other forms of cooking utensils. Fig. 7 is a plan of a receptacle for heating metals, and Fig. 8 is a perspective view of a casing for heating sad-irons.

The apparatus comprises a frame having a longitudinal bottom bar A, the ends of which form axles for wheels A', horizontal cross-bars B, with wheels B' journaled at one end of each of them, a short longitudinal bar C, connecting the bars B adjacent to the wheels B', uprights D, rising from the bottom bars, top bars E, connecting the upper ends of the uprights, and braces F, connected with the uprights and with the bottom bars.

To two of the uprights D is pivoted a swinging frame G, having a head G' at its pivoted end and parallel bars $G^2$ connecting said head with the opposite end bar $G^3$ of the swinging frame. To the said end bar are secured cords or wires H, passing over pulleys H', journaled in two of the uprights D, said cords then passing to boxes I', surrounding a winding-shaft I, to which the ends of the cords are fastened. $I^2$ is a crank for turning the shaft, and $I^3$ represents set-screws adapted to engage the shaft to lock the same.

In the head G' are set lenses J, biconvex, as shown, or of any other suitable shape. In front of the lenses are arranged hinged hoods or caps J', provided with hooks $J^2$ to hold the hoods shut. Rearwardly from said lenses there project tapering tubes K, blackened on the inside to prevent reflections. These tubes at their rear ends fit into sockets L' upon the casings L, each provided with a handled lid $L^2$ and with lugs $L^3$, resting on the bars $G^2$. Each casing is provided with a partition $L^4$, having an opening and a funnel $L^5$ projecting forwardly therefrom in axial alinement with the socket L' and lens-tube K. On the side of the casing L is an opening $L^6$, adapted to be closed by a slide $L^7$, Fig. 2, for allowing the attendant to ascertain if the sun's rays fall in the desired direction. Preferably a mirror *l* is provided to enable the attendant to view the inside of the apparatus from the rear. An apertured shield $L^8$ may be located in the rear of the funnel or cone $L^5$. In the chamber $L^9$ at the rear of the partition $L^4$ extends a transverse shaft formed of outer sections M, adapted to engage alining sockets M', projecting from the cooking vessel N. One of the shaft-sections M has a crank $M^2$ for turning the shaft and the vessel; but such cranks are provided only on the first and last receptacles or casings L of the series, and the adjacent shaft-sections M of the several casings are connected with each other, so that all the vessels N may be adjusted together. Through the rear wall of the casing L passes a shaft O, provided with a crank O' and adapted to engage the vessel N above the sockets M'. At the bottom is located a shaft P, having a crank P' and a projection $P^2$ extending into the chamber $L^9$. A set-screw $P^3$ serves to lock the shaft P, and set-screws $M^3$ lock the shaft M after adjustment. Through the bottom of the casing projects a screw Q, adapted to engage the bottom of the vessel N to hold the same firmly in position after adjustment.

The cooking vessel N (shown in Figs. 3, 4, and 5) has an inner wall N', with an inclined bottom $N^2$, and an outer wall $N^3$, spaced from the inner wall to form a jacket, which is filled with ashes N⁴ or with some other bad conductor of heat. The open top of the vessel is adapted to be closed by a lid N⁵, the interior of which has a filling of ashes N⁶. At the bottom, on that side which normally faces the funnel L⁵, the outer wall or shell N³ has an opening N⁷, through which the sun's rays may pass to the inner wall N'. The casing L is preferably provided with a few apertures to allow steam and vapors to escape.

In Fig. 6 the vessel R has an inner wall R', an outer wall R², a tube R³ for the admission of the heating-rays, a lid R⁴, containing a filling of ashes R⁵, a like filling R⁶ between the inner wall R' and outer wall R², and feet R⁷. Within the inner wall R' is located a pan R⁸, hinged at its forward end R⁹ and provided with a bottom projection R⁰, extending through an opening R×. This vessel is adapted for use as a bread-pan.

The vessel shown in Fig. 7 has a casing S with sliding doors S' and a socket s to permit of introducing the metal or other substance to be heated, a funnel S², through which the sun's rays enter, lugs S³ to rest on the lateral bars G², and air inlet and outlet tubes S⁴ S⁵, one of which is connected with a fan to force air through the vessel, so that there will be an ample supply of oxygen to facilitate the chemical reaction.

Finally, in Fig. 8 I have shown a casing or receptacle T of proper shape for holding a sad-iron and provided with a cover T' and with an aperture T², through which the heat-rays may fall upon the sad-iron.

In each case, the proper vessels having been secured to the swinging frame G, the said frame and the vessels therein are so adjusted that the sun's rays concentrated by the lenses J will fall upon the inner wall of the vessel. The opening L⁶ allows the course of the light to be watched, so that proper adjustment may be made. The frame G may be inclined more or less by turning the crank I², while the vessel, as N, may be adjusted by means of the cranks M², O', and P' and then locked by the screw Q. If it is not desired to use all the lenses, the light may be excluded from some of them by means of the hoods J'. The mounting of the main frame on the wheels A' B' allows the frame to be readily turned so as to keep the lenses J toward the sun. The heat of the sun's rays will be concentrated by the lenses upon the vessel and the material to be heated, and loss of heat will be prevented by the use of the protecting lens-tubes K and of the non-conducting filling N⁴ N⁶ R⁵ R⁶. Thus water may be boiled in a very short time, vegetables may be cooked, bread baked, solder or metals melted. In fact, any operation which requires heat may be safely and expeditiously conducted. When used for culinary purposes, my invention has the important advantages of cleanliness, owing to the absence of soot-forming fuel. Further, the flavor of the food is not impaired, and there is no danger of contamination by combustion-gases. For reactions where combustion takes place requiring an ample supply of oxygen the forcing of a current of air through the vessel by means of a fan or equivalent device will be of material assistance.

The apparatus is of such simplicity that its cost need not exceed that of an ordinary stove or range.

Having thus described my invention, I claim as new and desire to secure by Letters Patent—

1. A solar heating apparatus, comprising a main frame capable of being turned about a vertical axis, a swinging frame supported on said main frame to turn about a horizontal axis, a light-concentrating device carried by said swinging frame, and a heating vessel carried by said frame at the focus of said light-concentrating device, and mounted to swing about a horizontal axis relatively to the swinging frame.

2. A solar heating apparatus, comprising a main frame capable of being turned about a vertical axis, a swinging frame supported on said main frame to turn about a horizontal axis, a light-concentrating device carried by said swinging frame, a heating vessel carried by said swinging frame at the focus of said light-concentrating device, and mounted to swing about a horizontal axis relatively to the swinging frame, and adjusting devices connecting said swinging frame and the heating vessel.

3. A solar heating apparatus, comprising a main frame, a pivoted frame carried thereby, a lens at the pivoted end of the said frame, a pivoted heating vessel also carried by the swinging frame at the focus of the lens, and a lens-tube extending from the lens to the said heating vessel.

4. A solar heating apparatus, comprising a main frame, a swinging frame carried thereby, a light-concentrating device on the swinging frame, a casing carried by the swinging frame and provided with an opening facing toward said light-concentrating device, and a heating vessel mounted in said casing to swing about a horizontal axis.

5. A solar heating apparatus, comprising a main frame, a swinging frame carried thereby, a lens at the fulcrum end of the said frame, a casing also carried by said frame, an adjustable heating vessel in the casing, and a lens-tube extending from the lens to the casing.

6. A solar heating apparatus, comprising a main frame, a swinging frame carried thereby, a lens on the swinging frame, a casing also carried by said frame, and provided with a partition having an opening and a funnel-shaped tube projecting therefrom toward the lens, and a heating vessel located in said casing on the other side of the partition.

7. A solar heating apparatus, comprising a main frame, a swinging frame carried thereby, a lens on the swinging frame, a casing also carried by said frame, and provided with a partition having an opening and a funnel-shaped tube projecting therefrom toward the lens, a heating vessel located in said casing on the other side of the partition, and a lens-tube extending from the lens to the casing.

8. In a solar heating apparatus, the combination with a casing, and a sectional shaft mounted therein, one section being provided with a crank, of a heating vessel within the casing and provided with alining sockets to receive the shaft-sections, and means for locking the vessel in position.

9. In a solar heating apparatus, the combination of a casing provided with an opening and with a partition dividing it into two compartments said partition having an opening from which a funnel projects, and a heating vessel adjustably supported in one compartment of the casing and provided with an opening in its lower portion.

10. A solar heating apparatus, comprising a main frame, a swinging frame mounted in the main frame, a lens carried by the swinging frame, a tube extending from the lens, a casing also carried by the swinging frame and provided with an opening receiving the lens-tube, and with a partition dividing the casing into two compartments, said partition having an opening in alinement with the opening of the casing and a funnel around said opening, and a heating vessel adjustably mounted in one compartment of the casing and provided with an opening in its lower portion opposite the opening in the partition.

11. In a solar heating apparatus, the combination with a support, and a plurality of casings carried by the support and arranged side by side, of a heating vessel in each casing and provided with alining sockets, and a sectional shaft carried by each casing and entering the sockets of the heating vessel, the adjacent shaft-sections of the several casings being connected, and one section of an end casing being provided with a crank-handle, as set forth.

In testimony whereof I have signed my name to this specification in the presence of two subscribing witnesses.

MARCOS DE LA GARZA.

Witnesses:
BENIGNO LOYA,
LONGINOS BALDERMANN.